(12) United States Patent
Byrne et al.

(10) Patent No.: US 9,183,279 B2
(45) Date of Patent: Nov. 10, 2015

(54) SEMANTIC QUESTIONING MECHANISM TO ENABLE ANALYSIS OF INFORMATION ARCHITECTURES

(75) Inventors: Brian P. Byrne, Austin, TX (US); Sushain Pandit, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 13/240,774

(22) Filed: Sep. 22, 2011

(65) Prior Publication Data

US 2013/0080461 A1    Mar. 28, 2013

(51) Int. Cl.
   *G06F 17/30* (2006.01)

(52) U.S. Cl.
   CPC .... *G06F 17/30654* (2013.01); *G06F 17/30958* (2013.01)

(58) Field of Classification Search
   CPC .................... G06F 17/30958; G06F 17/30654
   USPC .......................................................... 707/769
   See application file for complete search history.

(56) References Cited

U.S. PATENT DOCUMENTS

| | | | | |
|---|---|---|---|---|
| 7,613,712 | B2 * | 11/2009 | Greenblatt et al. | 1/1 |
| 2002/0073086 | A1 * | 6/2002 | Thompson et al. | 707/10 |
| 2003/0100996 | A1 * | 5/2003 | Yang et al. | 702/19 |
| 2006/0095406 | A1 * | 5/2006 | Bestgen et al. | 707/3 |
| 2007/0094256 | A1 * | 4/2007 | Hite et al. | 707/6 |
| 2007/0094288 | A1 * | 4/2007 | Enenkiel | 707/101 |
| 2007/0198456 | A1 * | 8/2007 | Betz et al. | 707/1 |
| 2008/0104004 | A1 | 5/2008 | Brave et al. | |
| 2008/0104032 | A1 | 5/2008 | Sarkar | |
| 2009/0193328 | A1 * | 7/2009 | Reis et al. | 715/231 |
| 2009/0210390 | A1 | 8/2009 | Lane | |
| 2009/0299646 | A1 * | 12/2009 | Shams et al. | 702/19 |
| 2010/0106729 | A1 | 4/2010 | Pan et al. | |
| 2011/0078166 | A1 * | 3/2011 | Oliver et al. | 707/760 |
| 2011/0246450 | A1 * | 10/2011 | Guzenda | 707/716 |
| 2011/0246671 | A1 * | 10/2011 | Guzenda | 709/240 |
| 2012/0254102 | A1 * | 10/2012 | Li et al. | 706/58 |
| 2013/0041897 | A1 * | 2/2013 | O'Donnell et al. | 707/736 |

OTHER PUBLICATIONS

OpenLink Software, "OpenLink AJAX Toolkit (OAT) Wiki Web Interactive SPARQL Query Builder Basic Tutorial", 2008, pp. 1-20.*
Quan et al, "RDF Authoring Environments for End Users", 2003, pp. 1-8.*
Russell et al, "Nitelight: A Graphical Editor for SPARQL Queries", 2008, pp. 1-2.*

(Continued)

*Primary Examiner* — Apu Mofiz
*Assistant Examiner* — Jared Bibbee
(74) *Attorney, Agent, or Firm* — Sughrue Mion, PLLC

(57) ABSTRACT

Methods, computer program products and systems are directed to receiving a query regarding an information architecture, selecting a set of nodes based on the query, from a plurality of nodes in a weighted linked graph, the weighted linked graph comprising the plurality of nodes and a plurality of pathways, each of the plurality of nodes comprising a source of information regarding the information architecture, each of the plurality of pathways connecting one of the plurality of nodes to another of the plurality of nodes, each of the plurality of pathways comprising a weight, determining a path from the plurality of pathways that passes through all of selected nodes, and presenting the path in response to the query.

20 Claims, 4 Drawing Sheets

(56) References Cited

OTHER PUBLICATIONS

R. Iyer et al., "Inferring Asset Quality: Determining Borrower Creditworthiness in Peer-to-Peer Lending Markets," http://www.nber.org/~luttmer/peerlending.pdf; pp. 1-52, Jun. 2011; (retrieved Sep. 19, 2011).

J. Goodall et al., "Camus: Automatically Mapping Cyber Assets to Missions and Users," Military Communications Conference, 2009. pp. 1-7, MILCOM 2009. IEEE, Oct. 2009.

* cited by examiner

200

SEMANTIC QUESTIONING MECHANISM TO ENABLE ANALYSIS OF INFORMATION ARCHITECTURES

BACKGROUND

1. Field

The present invention relates to information architectures, and more specifically, to a semantic questioning mechanism to enable analysis of information architectures.

2. Description of Related Art

Managing information assets, data consumers, and solution architectures is a complex task. Large organizations can have thousands of information sources and consumers interrelated in very complex and poorly defined ways. Related art approaches to understanding the use, interdependencies and relationships of enterprise information assets are deterministic. This means that one only knows what one already knew to ask about. One could track who is using what information sources, if one knows that those information sources exist in the first place. However, this is rarely the case at the enterprise level. The Information Technology (IT) environments of large organizations experience rogue "unofficial" sources of information, partially supported solutions and continued use of deprecated sources.

SUMMARY

According to embodiments of the present invention a method and computer program product, which involve receiving a query regarding an information architecture; select a set of nodes based on the query, from a plurality of nodes in a weighted linked graph. The weighted linked graph may include the plurality of nodes and a plurality of pathways, wherein each of the plurality of nodes may include a source of information regarding the information architecture. Each of the plurality of pathways connects one of the plurality of nodes to another of the plurality of nodes. Each of the plurality of pathways includes a weight. A path is determined from the plurality of pathways that passes through all of selected nodes, and the path is presented in response to the query.

According to another embodiment of the present invention, a system, which may include a user interface, receives a query regarding an information architecture. A graph creation unit creates a weighted semantic graph comprising a plurality of nodes and a plurality of pathways, each of the plurality of nodes involving a source of information regarding the information architecture, each of the plurality of pathways connecting one of the plurality of nodes to another of the plurality of nodes, each of the plurality of pathways involving a weight. A processor selects a set of nodes based on the query and determines a path from the plurality of pathways that passes through all of selected nodes. The user interface presents the path in response to the query.

Additional aspects related to the exemplary embodiments will be set forth in part in the description which follows, and in part will be apparent from the description, or may be learned by practice of the exemplary embodiments. Aspects of the exemplary embodiments may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed embodiments or application thereof in any manner whatsoever.

BRIEF DESCRIPTION OF THE DRAWINGS

The accompanying drawings, which are incorporated in and constitute a part of this specification exemplify the exemplary embodiments and, together with the description, serve to explain and illustrate principles of the inventive techniques. More specifically.

DETAILED DESCRIPTION

Figure 1:
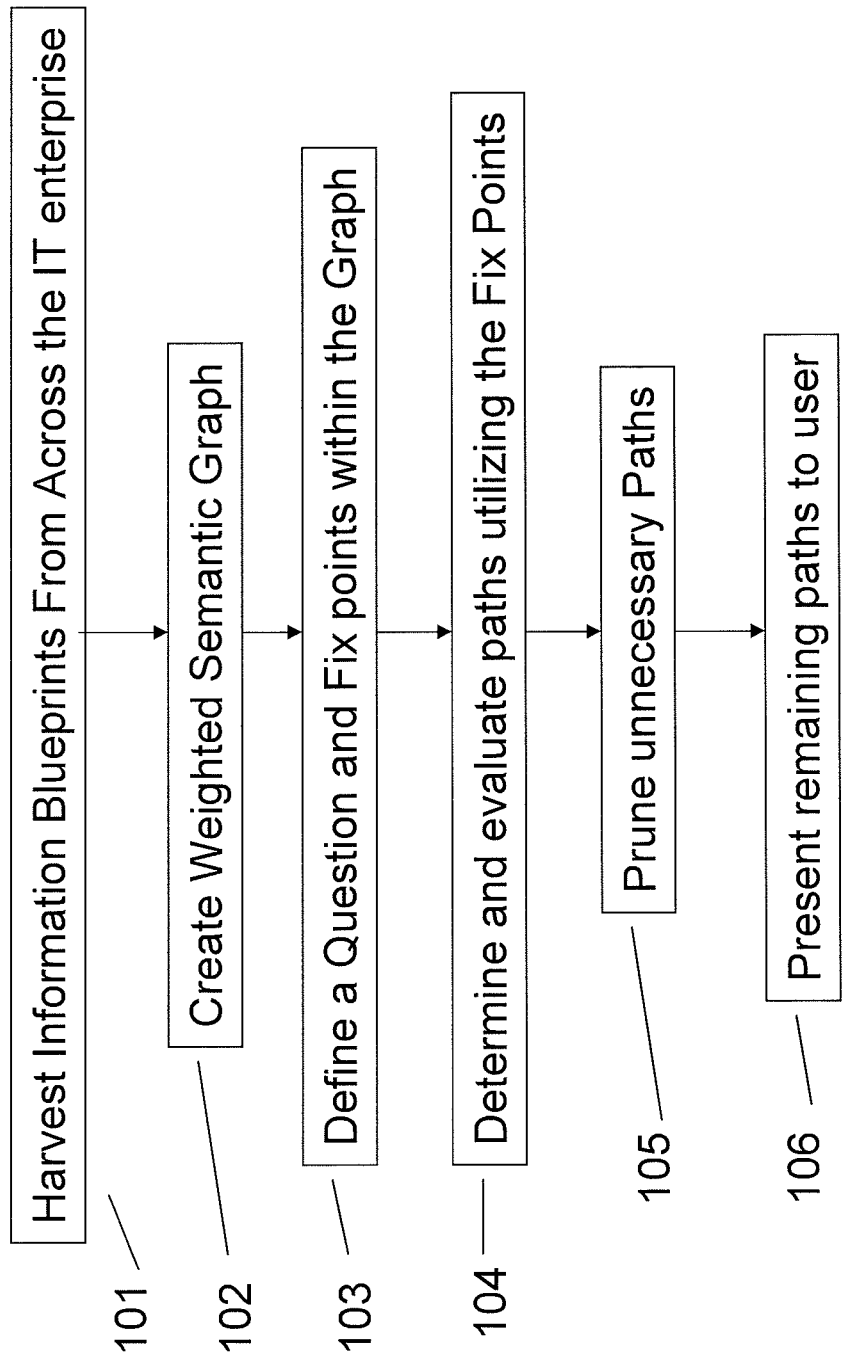
FIG. 1 illustrates a basic flowchart according to an exemplary embodiment of the invention.

In the following detailed description, reference will be made to the accompanying drawings, in which identical functional elements are designated with like numerals. The aforementioned accompanying drawings show by way of illustration, and not by way of limitation, specific embodiments and implementations. These implementations are described in sufficient detail to enable those skilled in the art to practice the exemplary embodiments and it is to be understood that other implementations may be utilized and that structural changes and/or substitutions of various elements may be made without departing from the scope and spirit of exemplary embodiments. The following detailed description is, therefore, not to be construed in a limited sense. Additionally, the exemplary embodiments as described may be implemented in the form of software running on a general purpose computer, in the form of a specialized hardware, or combination of software and hardware.

The exemplary embodiments described herein are directed to the leveraging of the many disparate views of information architecture that exist across project teams in an enterprise. These views may be non-homogenous, and are not a single source of enterprise knowledge. They can, however, act as an excellent source for the extraction of useful knowledge to drive inference and decision-making related to IT support within the enterprise as a whole.

Related art approaches to understanding the use, interdependencies and relationships of enterprise information, are deterministic and cannot answer top level questions about enterprise IT architectures. For example, but not by way of limitation, top level questions include "who is using this database", "where should projects be reading customer data from", "are users migrating from this old database to this new one?".

Further, the related art IT infrastructure forces users to act in a declarative way. That is, the user must already know what he is looking for and explicitly search for that information. Thus, the scope over which one can return a true or affirmative result is limited at least by how broadly one can look.

Exemplary embodiments of the invention described herein allow users (e.g. high level governance/stewardship) to issue freeform queries against a known state of an IT infrastructure. The exemplary embodiments thereby do not necessarily require that a single universal statement of enterprise architecture be available. Instead, the exemplary embodiments involve harvesting non-homogenous fragments of architecture that exist throughout the enterprise, and using the non-homogenous fragments as a unified pool of knowledge to answer questions.

Exemplary embodiments may further utilize imported architectural views (for example blueprints) to build a single large Resource Description Framework (RDF) graph. Over multiple architectural views, the common elements are found quickly, which may result in a large and complex RDF graph representing a sort of union of all architectural views. The exemplary embodiments then query this graph using defined hypotheses or questions, such that the queries are entirely user question based.

Examples of queries include freeform textual questions and drag and drop User Interfaces (UIs).

Freeform Textual Questions:

Queries can be received (e.g. through a user interface), containing freeform textual questions, such as "who is not accessing the trusted source for customer address information". In this case, the exemplary embodiments can use techniques similar to that used in document spell checking to map/suggest mappings for parts of the question to known elements in the RDF graph. For example, in the exemplary query, "Customer Address" can be mapped to a known reference to a similar business term in the RDF graph. Similarly, "who" can be mapped to the RDF concept of an IT project in the enterprise, and so on.

Drag and Drop User Interface:

Exemplary embodiments may also involve a UI that allows a user to drag and drop "concepts" from the RDF graph, which have in turn been extracted from imported IT architecture views. The drag and drop input may be utilized for queries, and the UI may allow the user to drag, drop and chain these RDF nodes to form a question. On issuing a question/hypothesis, the system evaluates the formed question against the RDF graph and returns relevant paths as "answers".

FIG. 1 illustrates a flowchart according to an exemplary embodiment.

Figure 2:
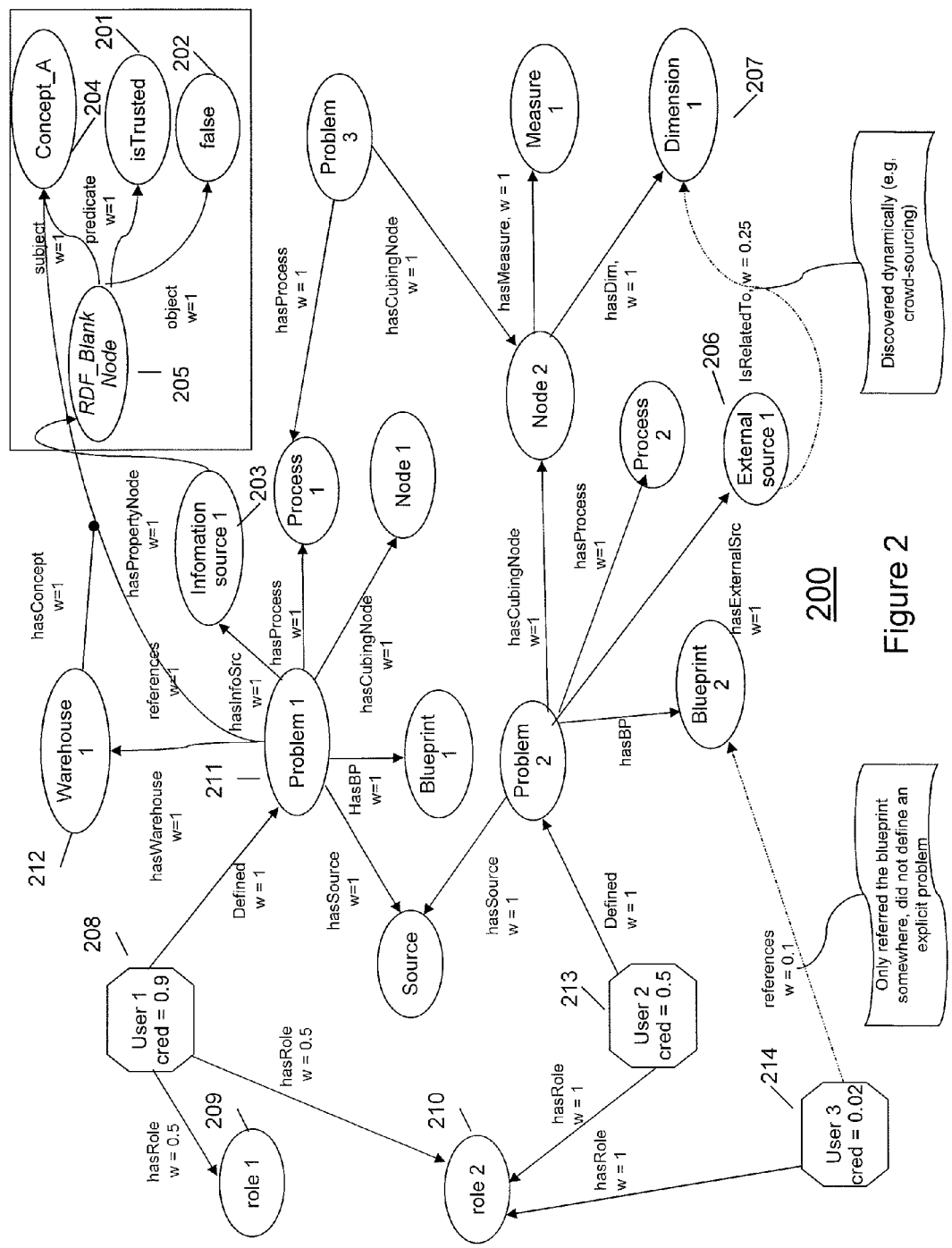
FIG. 2 illustrates a linked graph created according to an exemplary embodiment of the invention.

At 101, "information blueprints", metadata sources, models, docs, etc. from across the enterprise is harvested (e.g. imported). Such harvesting substantially produces non-homogenous fragments representing local views of architecture. From the harvesting 101, at 102 a weighted semantic graph is created. FIG. 2 illustrates an exemplary weighted semantic graph and is explained in greater detail below.

At 103, at least one of a graphical and a textual input method is used to define a question. An example of a defined question is "who is not going to the trusted source for 'customer contact preferences". Defined questions can be crafted from a pick list of items in the graph ('customer contact preference', 'source', etc.) or can be post processed and mapped against graph nodes. The questions may provide multiple "fixed points" against the graph.

At 104, the exemplary embodiments utilize a graph traversal algorithm that uses these fixed points as anchors, and determines and evaluates the possible paths through the graph that pass through these fixed points. In the present example, an RDF graph traversal algorithm is used, but any semantic search algorithm would also be sufficient for traversing the graph.

Once the possible paths have been determined, at 105 a heuristic prunes unnecessary paths. For example, encountering a backward arrow in a search of the weighted linked graph could lead to pruning of that particular path if the search algorithm already found a forward-only path of the weighted linked graph. A heuristic can be utilized to guide the search based on the weight assigned to the edges.

These paths are presented to the user as results in response to their question 106.

Because the exemplary embodiments are non-deterministic, prior knowledge of the pinpoint search result information is not required. Therefore, the user does not need to know what they are looking for and the required artifacts do not need to be imported. Additionally, the approaches of the exemplary embodiments may provide additional visibility across a wide range of non-homogenous and architectural information, accessible at an enterprise level. Partially structured knowledge may be reused to answer a broad set of questions, thereby being accessible to stakeholders. Exemplary embodiments of the invention may thereby provide visibility into the IT environment. Exemplary embodiments of the invention also may provide the ability to capture provenance and trust information in the form of explicit properties of information as well as the ability to make multiple intelligent probabilistic suggestions to the UI user based on weights assigned to paths, in addition to the answers provided to his/her question.

FIG. 2 illustrates an exemplary linked graph 200 according to an exemplary embodiment of the invention.

The linked graph of FIG. 2 may be constructed by a knowledge graph creation module, as described below herein. An Input: S={s_i}, a set of sources, similar to (but not limited to) existing (authored) blueprints, metadata stores, models, business documents, etc. Accordingly, the knowledge graph creation module may create a weighted linked graph of metadata assets, users, roles, blueprints and other relevant artifacts that correspond to the high-level view on the authoring tool. The knowledge graph creation module may construct the graph by utilizing blueprint metadata to dynamically generate at least part of the graph.

The knowledge graph creation module may assign a confidence factor (e.g. weight) of 1 to links that constitute part of the problem and assign remaining weights based on the context (e.g, for a user who defined one problem each as part of 3 different roles, a weight of 0.333 would be assigned for each edge, implying a confidence of ⅓ for the problem that the user associated with each user-role). The knowledge graph creation module may then utilize small and medium enterprises (SME's), architect's, steward's and/or blueprint author's expertise to manually generate part of the graph.

The knowledge graph creation module may ask for explicit properties (e.g., isTrusted 201) and their values (e.g., true or false 202) associated with a source (e.g., Information source 1 203) with respect to a target (e.g., Concept_A 204). The knowledge graph creation module may then capture one or more of these explicit properties using one of the many mechanisms to capture relations. Such capturing can be done in RDF graphs through a mechanism knows as RDF reification. RDF reification allows searches to be performed across the graph seamlessly using SPARQL queries, irrespective of whether the search is traversing a "RDF_Blank_Node" 205 or another kind of node.

The knowledge graph creation module may utilize schema (or i.e., ontology) driven information extraction to extract an RDF graph from the document and use the aforementioned weighing scheme. The knowledge graph creation module may utilize other existing services to dynamically generate additional weighted semantic links and retain the weights that are assigned as part of the service. FIG. 2 illustrates an example where External Source 1 206 is related to Dimension 1 207 by a path discovered dynamically.

The knowledge graph creation module may generate additional links based on an unfinished blueprint or a stand-alone recommendation or reference to an asset/blueprint/process by a user. Once the weighted link graph has been created, the knowledge graph creation module may refer to an intelligent suggestion module to make intelligent dynamic suggestions to the UI user, based on the user's actions on the UI.

In exemplary embodiments utilizing the freeform query, the user is presented with a query input interface (e.g., plain-vanilla text-box) in which the user types in a query of a loosely-defined business picture as freeform textual input.

Using the prior knowledge of terms associated with its pre-calculated weighted, semantic graph, the intelligent suggestion module searches for important keywords in the natural-language question. Based on the keywords, the intelligent suggestion module triggers a heuristic search (e.g., utilizing the weights to guide the search) from the closest matching node in the graph, and selects the nodes in the graph as fixed points for conducting path searches.

Other methods of input can also be used besides the freeform textual input. For example, exemplary embodiments also allow a user to express a question in speech form and use a voice to text converter for providing input. The user can also write the input and have the input scanned by the system. The user can also be presented with possible keywords for creating the input, in a drag and drop interface or other methods.

In exemplary embodiments utilizing the drag and drop interface, the user creates an initial widget based on the user's understanding of requirements. The intelligent suggestion module maps this initial widget to an internal node and uses the widget as the initial node in the graph for performing the search.

In exemplary embodiments utilizing the drag and drop interface, the user creates a plurality of initial widgets and places a Question Mark ("?") widget between the plurality of widgets. Then, the user connects the widgets to the question-mark node. In the exemplary embodiment, the intelligent suggestion module maps the initial widgets to respective different nodes in the graph and performs a "find all paths between the two nodes" search, instead of a guided-heuristic search that discovers as many relevant paths can be found starting from a unique node on the graph.

In exemplary embodiments, upon discovering the relevant paths, nodes may be collected along those paths and certain key relevant nodes can be selected and presented to the user. After selecting such key nodes, exemplary embodiments may additionally map the nodes to relevant widgets on the UI and make suggestions to the user.

In exemplary embodiments of the drag and drop user interface, the question-mark ("?") node is automatically replaced with a suggestion, such as nodes that may occur in the found paths.

In exemplary embodiments of the drag and drop user interface, the suggestion is displayed on a side-panel, etc. of the user interface.

For performing the search, various search methods that operate on semantic graphs, can be used. The UI user enters a meta-level free-text question, such as, "Who is not using a trusted source for customer data?" Based on this question, the method may determine keywords to operate on, such as "trust" and "customer data".

From the keywords, a node or a set of nodes may be selected based on the keyword by utilizing a search for determining fixed points with the selected nodes. In the abovementioned example, given the keywords "trust" and "customer data", the search method may find a node representing a matching property for "trust" and a matching node for "customer data". The search method may search for an internal knowledge base and determine that "trust" has as its matching property Trusted, which is of type boolean. Applying this knowledge, the search method re-scans the question, looking for possible negations. The search method may encounter a "not" and assigns a value false to this particular instance of the property. The search method also determines that Concept_A 204, as shown in FIG. 2, corresponds to a Customer Data node. For performing the matching, any word-root or syntactic comparison algorithm can be employed.

Once finalized, the two nodes are used as the fixed points to initiate the search. The search is launched on the graph 200 between the nodes of type User (e.g, user 1 208, user 2 213, user 3 214 in FIG. 2) and RDF blank nodes 205 with a related subject=Concept_A 204, predicate=is trusted 201 and object=false 202. The search may be semantic in nature and can look for patterns, (e.g. <subject, predicate, object>). In the present example, the search pattern could be, for example, (?sub ?pred RDF_BLANK_NODE) && (RDF_BLANK_NODE "subject" Concept_A) && (RDF_BLANK_NODE "predicate" Trusted) && (RDF_BLANK_NODE "object" False). The search may then attempt to find all substitutions for ?sub and ?pred.

From the above semantic search example, the search determines that User 1 208 with role 1 209 and role 2 210 defines problem 1 211, which has 3 paths to Concept_A 204. Problem 1 211 uses a warehouse 212, which refers to Concept_A 204. The node Concept_A 204 is defined by the information source 1 203, which is NOT a trusted source for Concept_A. Thus, problem 1 211 uses non-trusted sources. User 1 208 has defined the problem, and is thus using a non-trusted source of information.

The intelligent search module discovers indirect paths from user 2 213 and user 3 214 to RDF_Blank_Node 205. However, since the paths are not uni-directional, the intelligent search module assigns a probability to this finding based on at least the weights, confidence factors, and number of back arrows.

The exemplary embodiment is not limited to the foregoing. For example, the UI may be updated with suggestions of a reference User 1, and suggestions about Users 2 and 3 with justifications in the form of paths to Concept_A, probabilities, and other pertinent information.

Figure 3:
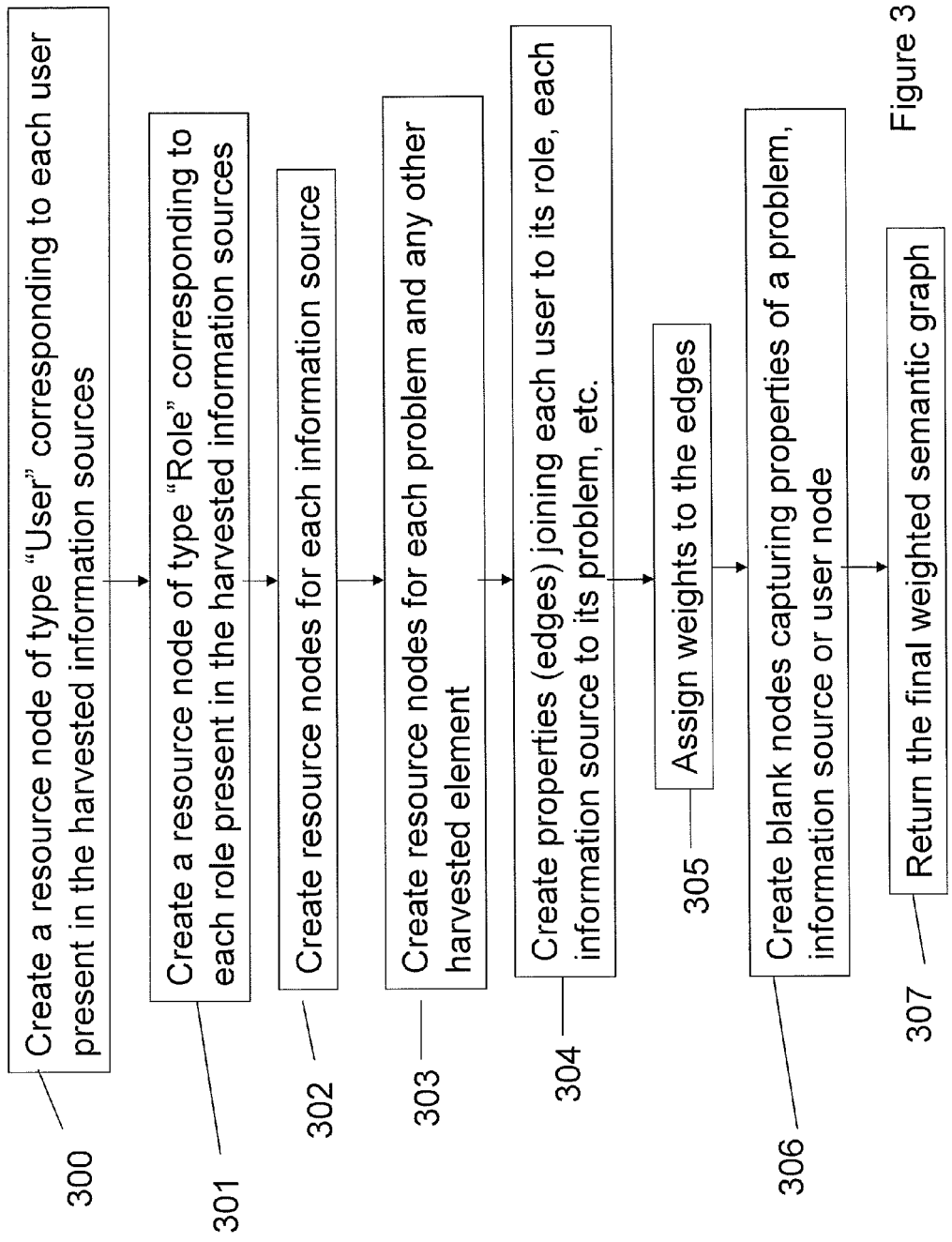
FIG. 3 illustrates a flowchart for how the overall weighted semantic graph is constructed in accordance to an exemplary embodiment.

FIG. 3 illustrates a flowchart for how the overall weighted semantic graph is constructed in accordance to an exemplary embodiment. The knowledge graph creation module may create a RDF resource node corresponding to each user 300 and role 301 present in the harvested information sources. The knowledge graph creation module may create RDF resource nodes for each information source 302, and additional RDF resource nodes for each problem and any other harvested element 303. RDF properties (edges) are created to join each user to their corresponding role, each information source to its corresponding problem, etc. as needed 304. Weights are then assigned to the edges 305 as described herein. RDF blank nodes are then created to capture the properties of a problem, information source, or user node as described above 306. The final graph with the resulting RDF nodes is then returned as the weighted semantic graph 307.

Figure 4:
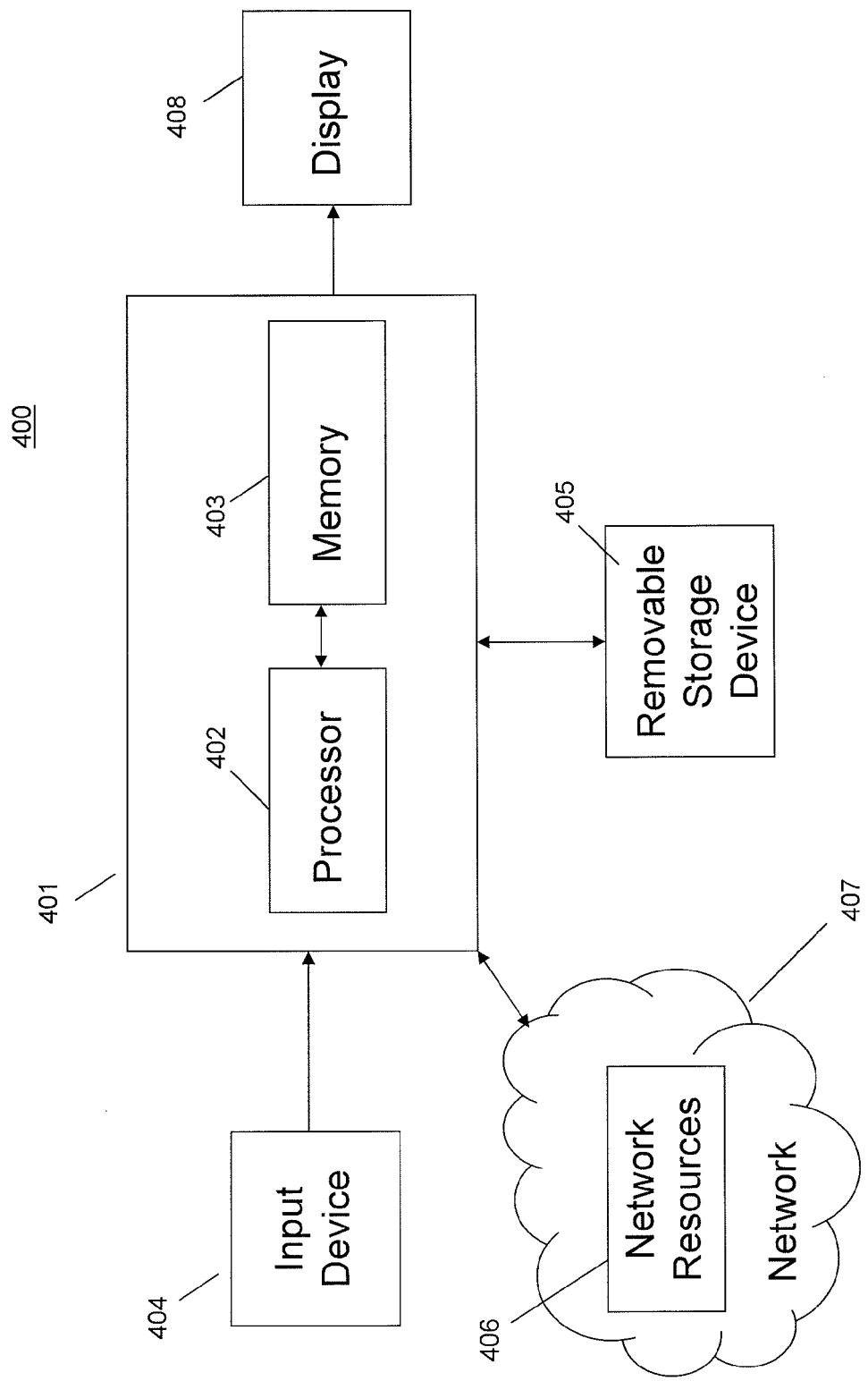
FIG. 4 is a block diagram that illustrates an exemplary embodiment of the invention as a computer/server system.

FIG. 4 is a block diagram that illustrates an embodiment of a computer/server system 400 upon which an exemplary embodiment may be implemented. The system 400 includes a computer/server platform 401 including a processor 402 and memory 403 which operate to execute instructions, as known to one of skill in the art. The term "computer-readable medium" as used herein refers to any medium that participates in providing instructions to processor 402 for execution. Modules or software units described throughout the specification may also be executed by the processor 402. Additionally, the computer platform 401 receives input from a plurality of input devices 404, such as a keyboard, mouse, touch device or verbal command. The computer platform 401 may additionally be connected to a removable storage device 405, such as a portable hard drive, optical media (CD or DVD), disk media or any other medium from which a computer can read executable code. The computer platform may further be connected to network resources 406 which connect to the Internet or other components of a local public or private network. The network resources 406 may provide instructions and data to the computer platform from a remote location on a network 407. The connections to the network resources 406 may be via wireless protocols, such as e.g., the 802.11 standards or cellular protocols, or via physical transmission media, such as cables or fiber optics. The network resources may include storage devices for storing data and executable instructions at a location separate from the computer platform 401. The computer interacts with a display 408 to output data and other information to a user, as well as to request additional instructions and input from the user. The display 408 may therefore further act as an input device 404 for interacting with a user.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   harvesting architectural views from across an enterprise;
   using the harvested architectural views to build a Resource Description Framework (RDF) graph that is a weighted linked graph representing an information architecture, by creating RDF resource nodes for each user, role, information source, and problem in the harvested architectural views;
   receiving a query regarding the information architecture represented by the RDF graph, the query being created by dragging and dropping at least two of the RDF resource nodes to create a chain representing the query;
   selecting a set of nodes based on the query, from a plurality of nodes in the RDF graph, the RDF graph comprising the plurality of nodes and a plurality of pathways, each of the plurality of nodes comprising a source of information regarding the information architecture, each of the plurality of pathways connecting one of the plurality of nodes to another of the plurality of nodes, each of the plurality of pathways comprising a weight;
   determining a query result path in the RDF graph from the plurality of pathways that passes through all nodes in the set of nodes selected based on the query; and
   presenting a visual representation of the determined query result path in the RDF graph that passes through all the nodes in the set of nodes selected based on the query.

2. The method of claim 1, wherein the weighted linked graph is a weighted semantic graph.

3. The method of claim 1, wherein the plurality of nodes is configured to be traversed by a semantic search or a discovery algorithm.

4. The method of claim 1, wherein receiving the query comprises receiving a freeform textual input comprising a question; wherein the selecting the set of nodes comprises extracting keywords from the query and selecting, for each keyword, each node in the set of nodes corresponding to the keyword.

5. The method of claim 1, wherein the presenting comprises collecting relevant nodes from the query result path of selected nodes and presenting the relevant nodes in response to the query.

6. The method of claim 5, further comprising:
   receiving a selection of two of the relevant nodes; and
   determining a path in the RDF graph connecting the two relevant nodes.

7. The method of claim 1, wherein the plurality of nodes comprises question mark nodes, and wherein each of the question mark nodes is replaced with a suggestion if the determined query result path includes question mark nodes.

8. A computer program product comprising a non-transitory computer readable storage medium having computer readable program code embodied therewith, the computer readable program code comprising code for:
   harvesting architectural views from across an enterprise;
   using the harvested architectural views to build a Resource Description Framework (RDF) graph that is a weighted linked graph representing an information architecture, by creating RDF resource nodes for each user, role, information source, and problem in the harvested architectural views;
   receiving a query regarding the information architecture represented by the RDF graph, the query being created by dragging and dropping at least two of the RDF resource nodes to create a chain representing the query;
   selecting a set of nodes based on the query, from a plurality of nodes in the RDF graph, the RDF graph comprising the plurality of nodes and a plurality of pathways, each of the plurality of nodes comprising a source of information regarding the information architecture, each of the plurality of pathways connecting one of the plurality of nodes to another of the plurality of nodes, each of the plurality of pathways comprising a weight;
   determining a query result path in the RDF graph from the plurality of pathways that passes through all nodes in the set of nodes selected based on the query; and
   presenting a visual representation of the determined query result path in the RDF graph that passes through all the nodes in the set of nodes selected based on the query.

9. The computer program product of claim 8, wherein the weighted linked graph is a weighted semantic graph.

10. The computer program product of claim 8, wherein the plurality of nodes is arranged to be traversed by a semantic search or a discovery algorithm.

11. The computer program product of claim 8, wherein receiving the query comprises receiving a freeform textual input comprising a question, wherein the selecting the set of nodes comprises extracting keywords from the query and selecting, for each keyword, each node in the set of nodes corresponding to the keyword.

12. The computer program product of claim 8, wherein the presenting the query result path in response to the query comprises collecting relevant nodes from the query result path and presenting the relevant nodes in response to the query.

13. The computer program product of claim 8, wherein the plurality of nodes comprises question mark nodes and wherein each of the question mark nodes are replaced with a suggestion if the determined query result path contains question mark nodes.

14. The computer program product of claim 13, further comprising computer readable program code for receiving a selection of two of the relevant nodes and determining a path in the RDF graph connecting the two relevant nodes.

15. A system comprising:
   a processor executing modules comprising:
      a user interface receiving a query regarding an information architecture represented by a Resource Description Framework (RDF) graph, the query being created by dragging and dropping at least two RDF resource nodes to create a chain representing the query;
      a knowledge graph creation module harvesting architectural views from across an enterprise, using the harvested architectural views to build the RDF graph that is a weighted semantic graph representing the information architecture, by creating RDF resource nodes for each user, role, information source, and problem in the harvested architectural views, the RDF graph comprising a plurality of nodes and a plurality of pathways, each of the plurality of nodes comprising a source of information regarding the information architecture, each of the plurality of pathways connecting one of the plurality of nodes to another of the plurality of nodes, each of the plurality of pathways comprising a weight; and
      a selecting module that selects a set of nodes based on the query and determines a query result path in the RDF graph from the plurality of pathways that passes through all nodes in the set of nodes selected based on the query;
   wherein the user interface presents a visual representation of the query result path in the RDF graph, determined by the selecting module, that passes through all the nodes in the set of nodes selected based on the query.

16. The system of claim 15, wherein the processor traverses the weighted semantic graph by a semantic search or a discovery algorithm.

17. The system of claim 15, wherein the user interface receives a selection of two nodes in the query result path, and wherein the processor determines a second path between the two selected nodes.

18. The system of claim 15, wherein the query comprises a freeform question, wherein the processor selects the set of nodes by extracting keywords from the query and selecting, for each keyword, each node in the set of nodes corresponding to the keyword.

19. The system of claim 15, wherein the processor collects relevant nodes from the query result path and wherein the user interface presents the relevant nodes in response to the query.

20. The system of claim 15, wherein the plurality of nodes comprises question mark nodes and wherein each of the question mark nodes are replaced with a suggestion if the determined query result path contains question mark node.

* * * * *